US009418220B1

(12) United States Patent
McKee et al.

(10) Patent No.: US 9,418,220 B1
(45) Date of Patent: Aug. 16, 2016

(54) CONTROLLING ACCESS TO MEMORY USING A CONTROLLER THAT PERFORMS CRYPTOGRAPHIC FUNCTIONS

(75) Inventors: Bret McKee, Fort Collins, CO (US); Chris D Hyser, Victor, NY (US); Robert D. Gardner, Fort Collins, CO (US); Brian Watson, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1429 days.

(21) Appl. No.: 12/260,762

(22) Filed: Oct. 29, 2008

Related U.S. Application Data

(60) Provisional application No. 61/024,013, filed on Jan. 28, 2008.

(51) Int. Cl.
*G06F 21/53* (2013.01)
*G06F 9/455* (2006.01)

(52) U.S. Cl.
CPC ............ *G06F 21/53* (2013.01); *G06F 9/45558* (2013.01)

(58) Field of Classification Search
CPC ............................ G06F 21/53; G06F 9/45558
USPC .................................................. 380/228, 264
See application file for complete search history.

(56) References Cited

U.S. PATENT DOCUMENTS 6,115,819 A 9/2000 Anderson
6,339,803 B1 * 1/2002 Glassen .................. H04L 49/90 709/232
6,941,475 B1 * 9/2005 Assetto et al. .................... 726/6
7,065,651 B2 * 6/2006 Evans ........................... 713/189
7,103,782 B1 9/2006 Tugenberg et al.
7,305,535 B2 * 12/2007 Harari et al. .................. 711/164
7,337,329 B2 * 2/2008 Evans ........................... 713/189
8,132,003 B2 * 3/2012 Durham .................. G06F 21/54 380/255
2002/0055910 A1 * 5/2002 Durbin .................. G06F 21/121 705/64
2004/0177261 A1 9/2004 Watt et al.
2004/0255145 A1 12/2004 Chow
2005/0246453 A1 * 11/2005 Erlingsson ............ G06F 9/4555 710/1
2006/0047972 A1 3/2006 Morais
2006/0059369 A1 * 3/2006 Fayad ................. G06F 21/6218 713/189
2006/0070066 A1 * 3/2006 Grobman ............ H04L 63/1441 718/1
2006/0075236 A1 * 4/2006 Marek ..................... G06F 21/54 713/171
2006/0183501 A1 * 8/2006 Egoshi et al. ................. 455/558
2006/0206658 A1 * 9/2006 Hendel ................... G06F 9/544 711/6
2006/0242151 A1 * 10/2006 Jogand-Coulomb ... G06F 21/10
2007/0016803 A1 1/2007 Lelikov
2007/0043667 A1 * 2/2007 Qawami .................. G06F 21/10 705/50
2007/0130470 A1 6/2007 Blom et al.
2007/0174910 A1 * 7/2007 Zachman et al. ............... 726/18
2007/0180271 A1 8/2007 Hatakeyama et al.
2007/0186110 A1 * 8/2007 Takashima ............ H04L 9/0836 713/173
2007/0192624 A1 * 8/2007 Ikeda .................... G06F 21/602 713/189
2008/0067255 A1 * 3/2008 Harari et al. .................. 235/492
2008/0244292 A1 * 10/2008 Kumar .................. G06F 9/4418 713/323
2009/0097642 A1 * 4/2009 Schnell ................... G06F 21/10 380/200

* cited by examiner

*Primary Examiner* — Dao Ho
(74) *Attorney, Agent, or Firm* — Trop, Pruner & Hu, P.C.

(57) ABSTRACT

A system includes a memory and a controller. The controller controls access to the memory and is adapted to be programmed with a key that is associated with a context. The controller is adapted to, in response to a request to access the memory, perform a cryptographic function on data associated with the request based on the key.

15 Claims, 4 Drawing Sheets

CONTROLLING ACCESS TO MEMORY USING A CONTROLLER THAT PERFORMS CRYPTOGRAPHIC FUNCTIONS

CROSS REFERENCE TO RELATED APPLICATIONS

This Application claims the benefit of U.S. Provisional Application Ser. No. 61/024,013, filed Jan. 28, 2008, titled "Controlling Access To Memory Using a Controller That Performs Cryptographic Functions"

BACKGROUND

Virtual machines can be provided in a computer to enhance flexibility and utilization. A virtual machine typically refers to some arrangement of components (software and/or hardware) for virtualizing or emulating an actual computer, where the virtual machine can include an operating system and software applications. Virtual machines can allow different operating systems to be deployed on the same computer, such that applications written for different operating systems can be executed in different virtual machines (that contain corresponding operating systems) in the same computer. Moreover, the operating system of a virtual machine can be different from the host operating system that may be running on the computer on which the virtual machine is deployed.

In addition, a greater level of isolation is provided between or among applications running in different virtual machines. In some cases, virtual machines also allow multiple applications to more efficiently share common resources (processing resources, input/output or I/O resources, and storage resources) of the computer.

The computer typically has hardware memory protection mechanisms to isolate the virtual machines. However, software defects may allow one virtual machine to access the memory that belongs to another virtual machine, thereby compromising the isolation.

DETAILED DESCRIPTION

Figure 1:
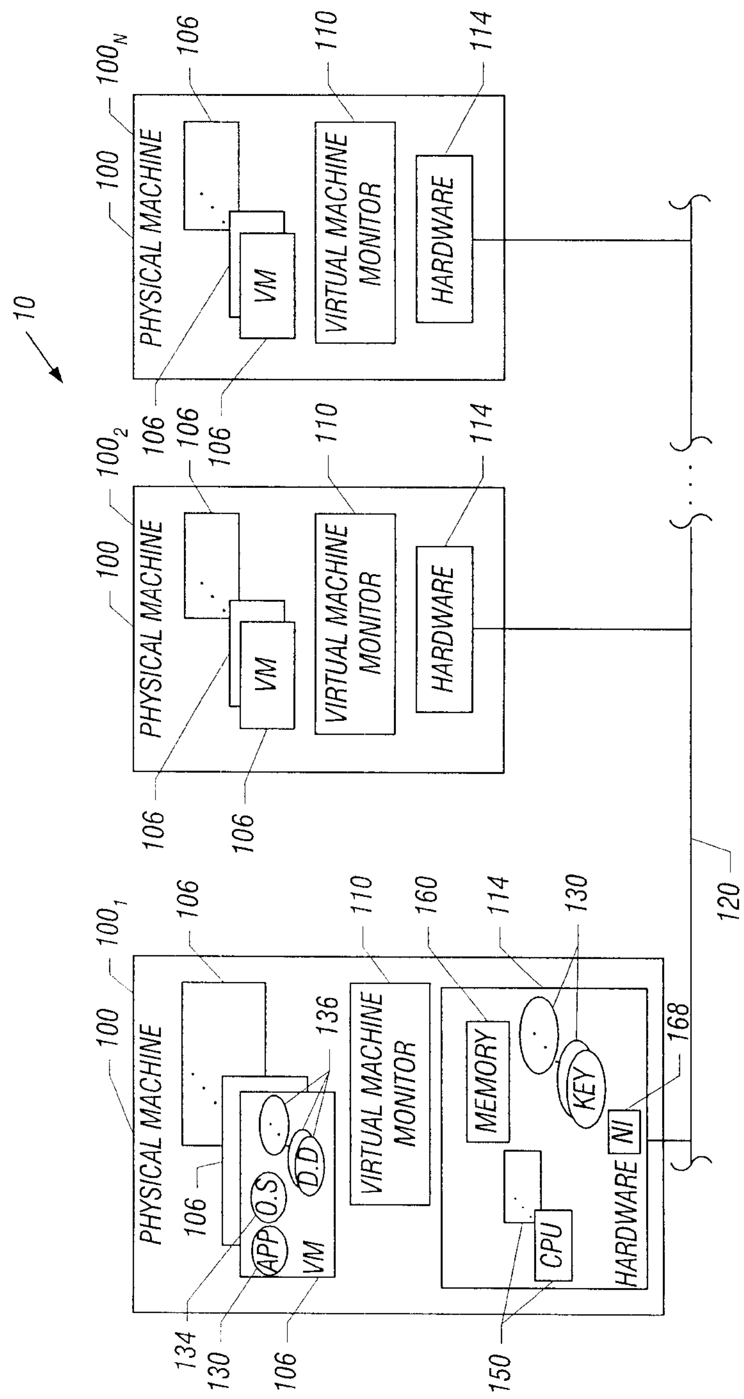
FIG. 1 is a block diagram of a system of physical machines on which virtual machines are deployed according to an embodiment of the invention.

Referring to FIG. 1, a system 10 in accordance with the invention includes multiple N physical machines 100 (physical machines $\mathbf{100}_1$, $\mathbf{100}_2$ . . . $\mathbf{100}_N$ being depicted in FIG. 1 as examples), which are interconnected by a network 120. As examples, the network 120 may be a local area network (LAN), a wide area network (WAN), the Internet or any other type of communication link. The network 120 may include system buses or other fast interconnects, which are not depicted in FIG. 1. The physical machines 100 may be located within one cabinet (or rack), or alternatively, the physical machines 100 may be located in multiple cabinets (or racks).

As non-limiting examples, the system 10 may be an application server farm, a storage server farm (or storage area network), a web server farm, a switch, a router farm, etc. Although three physical machines 100 are depicted in FIG. 1, it is understood that the system 10 may contain fewer or more than three physical machines 100, depending on the particular embodiment of the invention.

As examples, the physical machines 100 may be a computer (e.g., application server, storage server, web server, etc.), communications module (e.g., switch, router, etc.) or other type of machine. The language "physical machine" indicates that the machine is an actual machine made up of software and hardware. Although each of the physical machines 100 is depicted in FIG. 1 as being contained within a box, a particular physical machine 100 may be a distributed machine, which has multiple nodes that provide a distributed and parallel processing system.

Each physical machine 100 provides a platform for various virtual machines 106. Each physical machine 100 may contain a different number of virtual machines 106, and the virtual machines 106 on each physical machine 100 may be different to serve different purposes.

A virtual machine 106 refers to some partition or segment (made of software and/or hardware) of the physical machine 100, which is provided to virtual ize or emulate a physical machine. From the perspective of a user, a virtual machine 106 has the same appearance as a physical machine 100. As an example, a particular virtual machine 106 may include one or more software applications 130, an operating system 134 and one or more device drivers 136 (which are typically part of the operating system 134).

The operating systems 134 that are part of the corresponding virtual machines 106 within a physical machine 100 may be different types of operating systems or different versions of an operating system. This allows software applications designed for different operating systems to execute on the same physical machine 100.

The virtual machines 106 within a physical machine 100 are designed to share the physical resources of the physical machine 100. These physical resources include hardware 114, which, in turn, includes one or more central processing units (CPUs) 150, a system memory 160 and a network interface 168. It is noted that these components are listed as mere examples, as the hardware 114 may include other physical components, such as a storage area network interface (SAN), for example. The hardware 114 of the other physical machines 100 may contain similar or different components.

As also shown in FIG. 1, the physical machine 100 includes a virtual machine monitor (VMM) 110, which is often called a "hyperviser." The VMM 110 manages the sharing by the virtual machines 106 of the physical resources of the physical machine 100, including the hardware 114. The VMM 110 virtualizes the physical resources, including the hardware 114, of the physical machine 100. Also, the VMM 110 intercepts requests for resources from operating systems in the respective virtual machines 106 so that proper allocation of the physical resources of the physical machine 110 may be performed. As non-limiting examples, the VMM 110 manages memory accesses, input/output (I/O) device accesses and CPU scheduling for the virtual machines 106. Effectively, the VMM 110 provides an interface between the operating system of each virtual machine 106 and the underlying hardware 114 of the physical machine 100. The interface provided by the VMM 110 to an operating system of a virtual machine 106 is designed to emulate the interface that is provided by the actual hardware of the physical machine 100.

Ideally, the hardware of the physical machine isolates the virtual machines. However, in conventional physical machines, software defects may permit one virtual machine to gain access to the memory space that belongs to another machine. For purposes of providing an additional defense in depth, the memory space associated with each context may be associated with a different key. The term "context" refers to a particular operating environment that is associated with a particular entity, such as a given virtual machine, user, process, task, etc. A "task" is a basic unit of programming, such as an application, which an operating system controls; and a "task" may be, as examples, an entire program or each of a series of invocations of the program. At any given time, the physical machine 100 has a current context, which may be, as an example, associated with a particular virtual machine 106 so that all CPU generated memory requests are ideally directed to region(s) of the system memory 160 that are affiliated with the virtual machine 106.

Figure 2:
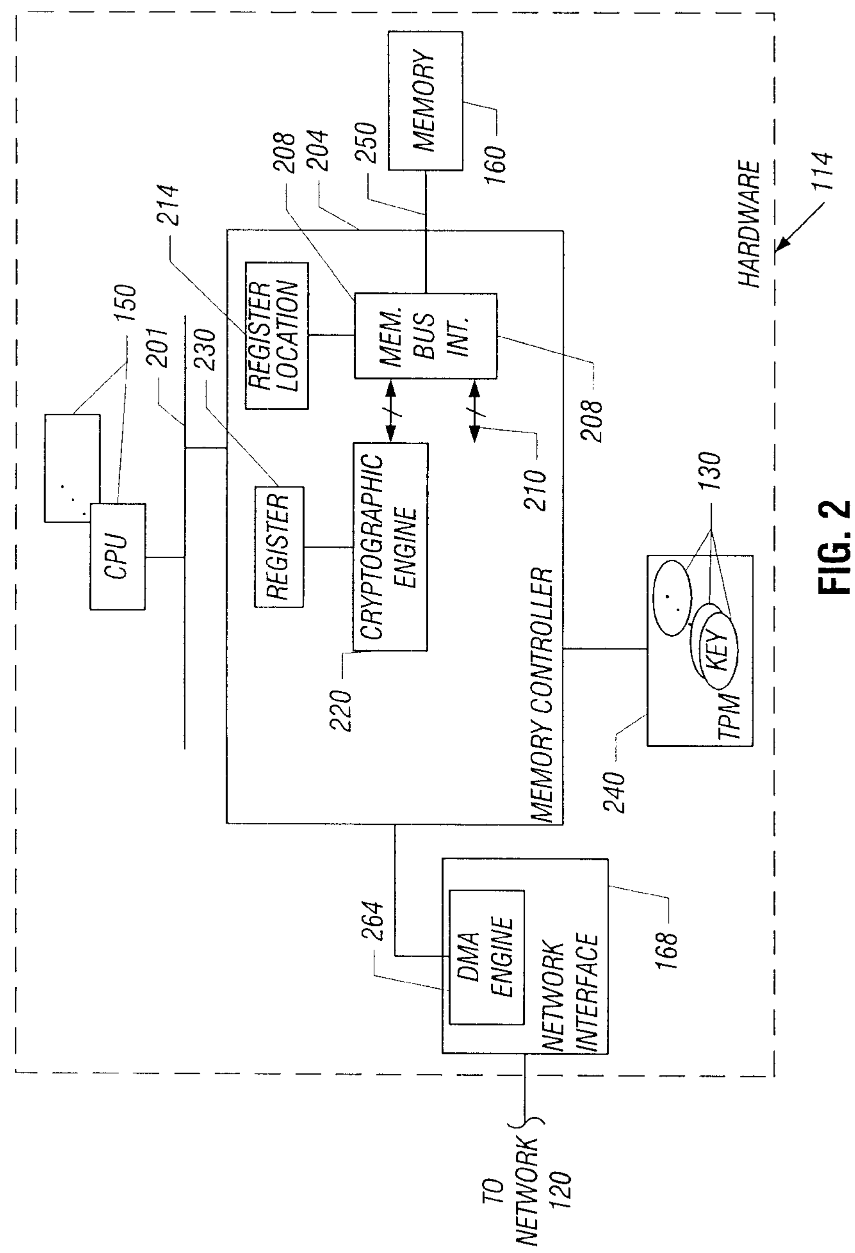
FIG. 2 is a block diagram of hardware of a physical machine according to an embodiment of the invention.

Referring to FIG. 2, more specifically, a memory controller 204 of the hardware 114 is programmed with the key associated with the current context so that the memory controller 204 encrypts data that is stored in the system memory 160 based on the key and decrypts data that is retrieved from the system memory 160 based on the key. Due to this scheme, an execution entity cannot read meaningful out of context data, as the memory controller 204 is not currently encrypting and decrypting using the key that is associated with the out of context data.

For the exemplary hardware architecture that is depicted in FIG. 2, the CPUs 150 are connected by way of a system bus 201 to a north bridge that includes the memory controller 204, in accordance with some embodiments of the invention. Depending on the particular embodiment of the invention, the memory controller 204 may be part of a CPU 150, part of the system memory 160, part of the north bridge (as depicted in FIG. 2), a stand-alone unit or part of another component of the hardware 114. Regardless of the particular location of the memory controller 204, the memory controller 204 receives read and write requests from the CPUs 150 and based these requests performs corresponding operations to read and write data to and from the system memory 160. More specifically, the memory controller 204 includes the memory controller 204 that, in response to the read and write requests, generates signals on a memory bus 250 for purposes of communicating with the system memory 160.

Thus, for a particular read request, the memory controller 204 generates signals corresponding to a read operation on the memory bus 250, which causes the system memory 160 to generate signals on the memory bus 250 indicative of the data from the region of the memory 160, which is targeted by the read operation. Similarly, for a write operation, the memory controller 204 generates signals on the memory bus 250, which indicate the address of the targeted region of the memory 160 as well as the data to be written to the targeted region. In response to the write operation, the system memory 160 stores the data in the targeted region.

Unlike conventional arrangements, the memory controller 204 has a cryptographic mode in which the memory controller 204 communicates encrypted data with the system memory 160. In this manner, when configured in the cryptographic mode, the memory controller 204 encrypts plain text data associated with a read request to produce encrypted data, which is communicated across the memory bus 250 and stored in the system memory 160. Similarly, when configured in the cryptographic mode, the memory controller 204 receives encrypted data associated with a write request from the memory bus 250 and decrypts the data to produce plain text data.

For purposes of performing the above-described cryptographic functions, the memory controller 204 includes a cryptographic engine 220 that encrypts and decrypts data based on a cryptographic key 130. More specifically, the key 130 is associated with a particular context, or operating environment, of the physical machine 100. In examples that are set forth herein, each key 130 may be uniquely associated with one of the virtual machines 106. Therefore, when the CPU(s) 150 are executing instructions for a given virtual machine 160, which generate memory requests, the memory controller 204 encrypts and decrypts data based on the key 130 that is associated for the given virtual machine 160. Although for the following discussion, each key 130 is associated with a particular virtual machine 106, the keys 130 may be associated with other entities, in accordance with other embodiments of the invention. For example, in accordance with other embodiments of the invention, the keys 130 may be associated users, processes, tasks, etc.

It is assumed for purposes of the following examples, that the memory controller 204 is configured to operate in the cryptographic mode. Each time a context switch occurs (due to a change in the virtual machine 106 being executed), the appropriate key 130 for the new context is retrieved, stored in, and subsequently used by the memory controller 240 for purposes of encrypting data for storage in the system memory 160 and decrypting data that is retrieved from the system memory 160.

Because the memory controller 204 is only in possession of the key 130 for the current context, the plain text data for other contexts cannot be retrieved from the system memory 160, thereby maintaining isolation of the virtual machines 106. For example, due to a software defect, a virtual machine 106 (called an "out of context virtual machine 106" herein) that is not associated with the present context may retrieve out of context memory data. More specifically, the CPU(s) 150 may execute instructions associated with the out of context virtual machine 106 due to a software defect, and as a result of these executed instructions, memory requests may be generated to retrieve out of context memory data. Although the memory controller 204 may process the read requests and retrieve the requested data from the system memory 160, the memory controller 204 is not in possession of the correct key 130. Therefore, the memory controller 204 applies the wrong key 130 to decrypt the data, and the resulting decrypted data that is returned by the memory controller 204 to the out of context virtual machine 106 cannot be read or decoded by the out of context virtual machine 106. Thus, the cryptographic features of the memory controller 204 preserve isolation of the virtual machines 106 even when one of the virtual machines 106 attempts to retrieve out of context data.

The cryptographic features of the memory controller 240 also secure out of context memory when an execution entity other than one of the CPUs 150 requests out of context data. For example, direct memory access (DMA) engines, such as an exemplary DMA engine 264 of the network interface 168, may access the system memory 160 through the memory controller 204 without involvement by any of the CPUs 150. The DMA engine 264 may request data from an out of context memory region, and the memory controller 204 may provide data from the out of context memory region to the DMA engine 264 in response to the request. However, because neither the memory controller 204 nor the DMA engine 264 has knowledge of the correct key 130, the data content is protected. Thus, if the DMA engine 264 is used as part of a rogue network attack to steal confidential information (addresses, credit card numbers, etc.), the confidential information is protected, as the data that is retrieved from the out of context memory is rendered useless due to the lack of knowledge of the correct key 130.

Turning to specific details of an exemplary implementation, the memory controller 204 may include a register 230, which stores the key 130 for the present context. Therefore, when the memory controller 204 is configured to be in the cryptographic mode, the cryptographic engine 220 encrypts and decrypts data based on the key data that is stored in the register 230. As an example, when a context change occurs, such as when instructions for another virtual machine 106 are to be executed, the VMM 110 (see FIG. 1) accesses the register 230 for purposes of storing the key 130 that is associated with the virtual machine 106 in the register 230.

The VMM 110 may, in general, configure the memory controller 204 for the cryptographic mode of operation. For example, in accordance with some embodiments of the invention, the VMM 110 may set a control bit in a register location 214 of the memory controller 204 for purposes of enabling the encryption and encryption by the cryptographic engine 220. Thus, in accordance with some embodiments of the invention, the cryptographic services that are provided by the engine 220 may be turned off for some memory accesses, as some regions of the system memory 160 may store plain text data. When the control bit is placed in a state to enable the cryptographic engine 220, the cryptographic engine 220 uses the key indicated by the value stored in the register 230 for purposes of encrypting and decrypting the data that is communicated with the memory 160.

In accordance with some embodiments of the invention, the entire set of keys 130 may be stored in a trusted memory, such as a memory that is provided by a trusted platform module (TPM) 240, as a non-limiting example. In general, the TPM 240 is a microcontroller that stores secure information and only permits access to this information to an authorized requester (such as the VMM 110, for example), pursuant to the TPM specification 1.2 Revision 103, published on Jul. 9, 2007. The TPM 240 may also store a table that indexes the keys 120 to the different virtual machines 106 so that the VMM 110 may update the table as virtual machines 106 are created and removed. As an example, in response to a context change, the VMM 110 communicates with the TPM 240 to retrieve the appropriate key 130 and store the retrieved key 130 in the register 230 of the memory controller 204. Other trusted memories may be used to store the keys 130 in accordance with other embodiments of the invention.

The TPM 240 may be located in one of numerous locations in the physical machine 100, depending on the particular embodiment of the invention. As examples, the TPM 240 may be accessed through an input\output (I/O) hub, or south bridge (not shown in FIG. 2) of the physical machine 100; may be incorporated into the south bridge; may be accessed through an interface in the north bridge, or memory hub, etc.

Figure 3:
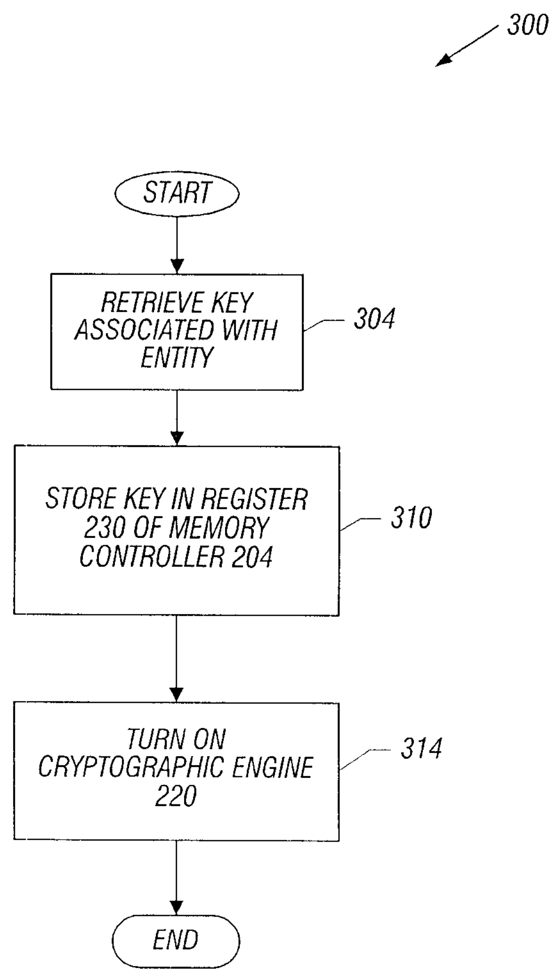
FIG. 3 is a flow diagram depicting a technique to initialize a memory controller for a given context according to an embodiment of the invention.

To summarize, in accordance with some embodiments of the invention, the VMM 110 (see FIG. 1), operating system, or other entity that controls context switches, may control the memory controller 204 pursuant to a technique 300 (see FIG. 3) in response to a context change. Referring to FIG. 3 in conjunction with FIG. 1, pursuant to the technique 300, the VMM 110 retrieves the key 130 that is associated with the next context (the virtual machine 106 whose instructions are next to be executed by the CPU(s) 150, for example). As a more specific example, the VMM 110 may access the TPM 240 to retrieve the key 130 that is associated with the upcoming context. As described above, the upcoming context may be associated with a particular virtual machine 106, user, task, process, etc. The VMM 110 then stores the retrieved key in the register 230 of the memory controller 204, pursuant to block 310. The VMM 110 then ensures that the cryptographic engine 220 is turned on, pursuant to block 314, which may involve as an example, storing the appropriate control bit in the register location 214.

Figure 4:
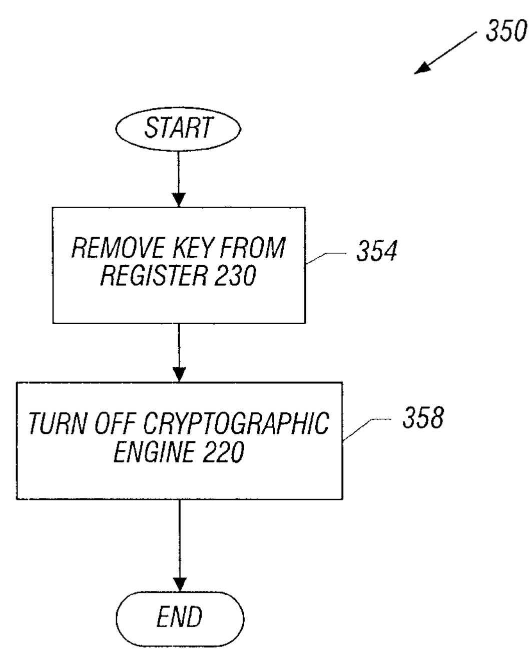
FIG. 4 is a flow diagram depicting a technique to reset the memory controller before a transition to another context according to an embodiment of the invention.

At the end of a given context, the VMM 110, operating system or other entity that controls context switches may perform a technique 350 that is generally depicted in FIG. 4. Referring to FIG. 4 in conjunction with FIG. 2, pursuant to the technique 350, the VMM 110 removes the key from the register 230 and turns off (block 358) the cryptographic engine 220. It is noted that in accordance with some embodiments of the invention, the resetting of the control bit to turn off the cryptographic engine 220 may clear the contents of the register 230. Thus, many variations are contemplated and are within the scope of the appended claims.

The tasks of FIGS. 3 and 4 may be provided in the context of information technology (IT) services offered by one organization to another organization. For example, the infrastructure (including the physical machines, and virtual machines of FIG. 1) may be owned by a first organization. The IT services may be offered as part of an IT services contract, for example.

Instructions of software described above (including the VMM 110, device drivers 136, applications 130, etc. of FIG. 1) are loaded for execution on a processor (such as one or more CPUs 150 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A system comprising:

a physical machine comprising a hardware platform to host a plurality of virtual machines, the hardware platform comprising a memory, a processor and a memory controller, and the memory controller comprising a register; wherein:

the processor is adapted to instruct a virtual machine monitor (VMM) to:

execute instructions associated with the plurality of virtual machines associated with a plurality of contexts;

in response to the processor changing from executing instructions associated with a first virtual machine of the plurality of virtual machines to executing instructions associated with a second virtual machine of the plurality of virtual machines, store a key associated with the second virtual machine in the register, the second virtual machine and the key being associated with at least one region of the memory less than the entire memory; and in response to termination of the second virtual machine, remove the key from the register;

the memory controller is adapted to:

use the key to encrypt content associated with the at least one region of the memory associated with the second virtual machine; and in response to a request to access the memory while the key is stored in the register, perform a cryptographic function on data associated with the request based on the key regardless of whether the request targets the at least one region of the memory associated with the second virtual machine or not; and decrypted content associated with a region of the memory not associated with the key is inaccessible to the second virtual machine.

2. The system of claim 1, further comprising:

a processor to program the memory controller with the key in response to a context switch.

3. The system of claim 1, wherein the request comprises a write request, and the memory controller is adapted to encrypt the data based on the key and store the encrypted data in the memory.

4. The system of claim 1, wherein the request comprises a read request, the data comprises encrypted data stored in the memory, and the memory controller is adapted to read the encrypted data from the memory and decrypt the encrypted data based on the key.

5. The system of claim 1, further comprising:

at least one of a direct memory access controller and a processor to generate the memory request.

6. The system of claim 1, further comprising:

a trusted memory to store the key and a plurality of additional keys, the additional keys being associated with other virtual machines of the plurality of virtual machines other than the second virtual machine.

7. A method usable with a computer system, comprising:

in response to a processor of the computer system changing from executing instructions associated with a first virtual machine of a plurality of virtual machines to executing instructions associated with a second virtual machine of the plurality of machines, instruct a virtual machine monitor (VMM) to store a key associated with the second virtual machine in a register of a memory controller, the second virtual machine and the key being associated with at least one region of a memory of the computer system less than the entire memory;

in response to termination of the second virtual machine, instruct the VMM to remove the key from the register; and in response to a request to access the memory while the key is stored in the register, using the memory controller to perform a cryptographic function on data associated with the request based on the key regardless of whether the request targets the at least one region of the memory associated with the second virtual machine or not, wherein decrypted content associated with a region of the memory not associated with the key is inaccessible to the second virtual machine.

8. The method of claim 7, wherein the request comprises a write request, and the act of using the memory controller comprises:

encrypting the data based on the key; and storing the encrypted data in the memory.

9. The method of claim 7, wherein the data comprises encrypted data stored in the memory, the request comprises a read request and the act of using the memory controller comprises:

reading the encrypted data from the memory and decrypting the encrypted data based on the key.

10. The method of claim 7, further comprising:

in response to a context switch, reading the key from a trusted memory and storing an indication of the key in the register of the memory controller.

11. The method of claim 10, wherein the acts of reading and storing comprise executing instructions associated with one of an operating system and a virtual machine hypervisor.

12. The method of claim 7, further comprising providing information technology services, wherein the storing of the key and using tasks are part of the information technology services.

13. An article comprising a computer-accessible non-transitory storage medium containing instructions that when executed by a processor-based system cause the processor-based system to:

execute instructions associated with a plurality of processes, the processes being associated with a plurality of contexts and the plurality of contexts being associated with a plurality of virtual machines;

in response to the processor-based system changing from executing instructions associated with a first process of the plurality of processes to executing instructions associated with a second process of the plurality of processes, instruct a virtual machine monitor (VMM) to retrieve a key associated with the second process from a trusted memory, the second process and the key being associated with at least one region of a second memory less than the entire second memory;

instruct the VMM to store an indication of the key in a register of a memory controller of the processor-based system to cause the memory controller to, in response to a request to access the second memory while the indication of the key is stored in the register, perform cryptographic functions on data associated with requests to access the second memory regardless of whether the request targets the at least one region of the second memory associated with the second process or not; and in response to termination of the second process, instruct the VMM to remove the indication of the key from the register, wherein decrypted content associated with a region of the second memory not associated with the key is inaccessible to the second process.

14. The article of claim 13, the storage medium storing instructions that when executed cause the processor-based system to selectively enable a cryptographic engine of the memory controller.

15. The article of claim 13, wherein the instructions are associated with a virtual machine hypervisor.

* * * * *